Aug. 24, 1965  G. J. MOSS, JR  3,202,999
ELECTRONIC CONVERTER AND PRINTER
Filed July 30, 1963  8 Sheets-Sheet 1

FIG.1.

INVENTOR
George J. Moss Jr.
BY
ATTORNEY

Aug. 24, 1965  G. J. MOSS, JR  3,202,999
ELECTRONIC CONVERTER AND PRINTER
Filed July 30, 1963  8 Sheets-Sheet 2

| FIG.6. | FIG.7. |
|---|---|
| FIG.10. | FIG.8. |

FIG.9.

INVENTOR
George J. Moss Jr.

BY

ATTORNEY

Aug. 24, 1965

G. J. MOSS, JR 3,202,999

ELECTRONIC CONVERTER AND PRINTER

Filed July 30, 1963

INVENTOR
George J. Moss Jr.

BY

ATTORNEY

Aug. 24, 1965

G. J. MOSS, JR 3,202,999

ELECTRONIC CONVERTER AND PRINTER

Filed July 30, 1963

INVENTOR
George J. Moss Jr.

BY N. J. Hansfield

ATTORNEY

Aug. 24, 1965   G. J. MOSS, JR   3,202,999
ELECTRONIC CONVERTER AND PRINTER
Filed July 30, 1963                                   8 Sheets-Sheet 7

FIG. 10

INVENTOR
George J. Moss Jr.
BY
ATTORNEY

FIG. 11

United States Patent Office 3,202,999
Patented Aug. 24, 1965

3,202,999
ELECTRONIC CONVERTER AND PRINTER
George J. Moss, Jr., Silver Spring, Md., assignor to the United States of America as represented by the Secretary of the Navy
Filed July 30, 1963, Ser. No. 298,801
16 Claims. (Cl. 346—33)
(Granted under Title 35, U.S. Code (1952), sec. 266)

The invention described herein may be manufactured and used by or for the Government of the United States of America for governmental purposes without the payment of any royalties thereon or therefor.

The present invention relates to a printing recorder for printing in Arabic numeral notation a time interval, and more particularly to an electrical printing recorder having a serial counter, for counting elapsed time, and logical converter circuitry for transforming the count into an Arabic numeral format for electrical printing by the recorder.

In the field of elapsed time recorders, it has been the general practice ot employ recorders having a counter, for counting elapsed time, and to directly print the electrical condition of the counter on a chart in a binary coded format. In order to interpret the chart, the indications on the chart had to be manually transformed into Arabic numeral notation. This was a time consuming and laborious job and often resulted in errors due to human failure, or failure in the printing.

The present invention provides a plurality of serially connected cascaded bistable elements for counting pulses from an external source, which are representative of elapsed time. An external event causes the elapsed time to be permanently recorded in Arabic numeral notation on a moving chart. The external event initiates operation of the recorder control circuitry within the printer to momentarily provide a buffer memory for a portion of the counter storage elements. Additionally, a one-stage carry pulse buffer storage momentarily halts counting in another portion of the counter. During the momentary engagement of the buffer storage and carry pulse buffer storage, the binary count in the other portion of the counter and the buffer memory is transformed through logical converting circuitry, into Arabic numeral notation. The recording chart is brought up to speed and the transformed binary pulses from the counter electrically print in Arabic numeral notation on the chart the contents of the storage counter. Further control logic continues the chart movement until the printing process is completed and provides a space between the printed numerals. Upon completion of the printing cycle, the counter is restored to its condition before the printing cycle and the contents of the single stage carry pulse buffer storage is logically transferred to the other portion of the counter, in order that the intervening timing pulses are not lost during the printing operation.

An object of the present invention is to count a serial pulse input indicative of elapsed time and to logically transform this count to electronically print out this count in Arabic numeral format.

Another object is to provide logical switching circuitry for converting the contents of an electronic counter, storing a number in the binary notation, and printing out the contents of the counter in Arabic notation.

A further object is to provide a time zone and block transformation for sequentially enabling logical gating circuitry to divide the Arabic numeral notation into a predetermined and uniform format.

Yet another object is to reduce the number of components normally required in a buffer storage system by providing a single stage temporary carry pulse storage and attendant logic.

Another object is to provide transfer circuitry for connecting a time independent counting chain with a time dependent printing circuitry.

Another object is to provide inhibit circuitry for preventing changing the Arabic numeral in storage during the printout period.

A further object is to provide a detecting circuit for controlling the printout sequence to prevent a hiatus in the printing of the numerals.

Other objects and many of the attendant advantages of this invention will be readily appreciated as the same becomes better understood by reference to the following detailed description when considered in connection with the accompanying drawings in which like reference numerals designate like parts throughout the figures.

FIG. 5 illustrates the manner in which FIGS. 6–10 are joined together;

GENERAL DESCRIPTION

Figure 1:
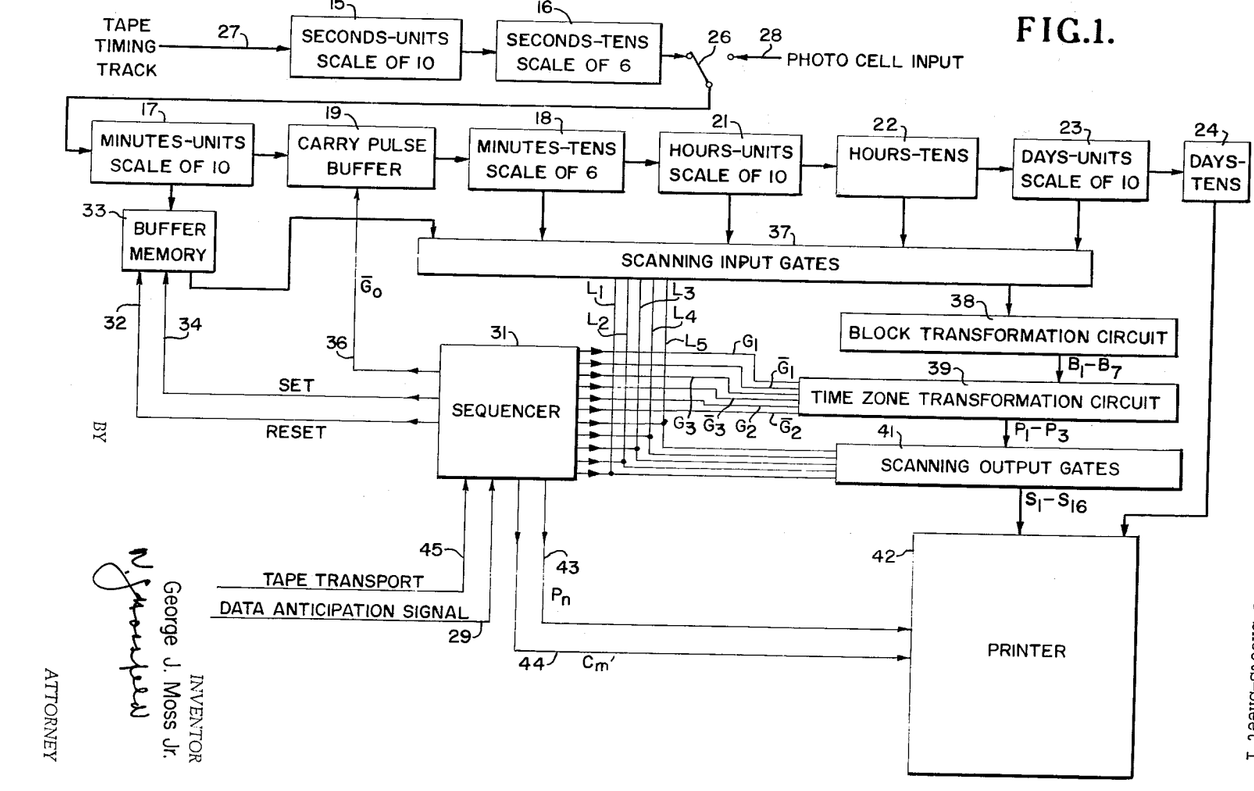
FIG. 1 illustrates a schematic diagram of the data flow and the control signals utilized to direct the flow of data from the input to the electrical printer.

Referring to FIG. 1 there is shown in block diagram form the major components of the system in which the heavy lines indicate data flow and the light lines indicate control pulses. A series connected, cascaded counting chain capable of counting up to twenty days by seconds or minutes is shown formed of a seconds-units scale of ten binary counter 15 connected to a seconds-ten scale of six binary counter 16. These two counters are capable of counting sixty seconds upon which event a pulse is provided for a minutes counter. The minutes counter is formed of a minutes-units scale of ten binary counter 17 connected to a minutes-tens scale of six binary counter 18 through a carry pulse buffer storage and transfer circuit 19. In normal operation the minutes-units counter 17 is directly connected to the minutes-tens counter 18 to count a total elapsed time of sixty minutes. The purpose and function of the carry pulse buffer logic circuit 19 will be described later. The minutes-tens counter 18 output is connected to an input on an hours-units scale of ten binary counter 21 which is in turn connected in series with an hours-tens binary counter 22, and together they form a counter in a scale of twenty-four. Upon the elapse of a period of twenty-four hours as recorded by the counters, an output pulse is produced to a days-units scale of ten counter 23 which is serially connected to a days-tens single stage binary counter 24. The days-units and days-tens counters are capable of counting to a total of nineteen days.

As shown in FIG. 1 a double throw single pole switch 26, connected between the seconds and the minutes counters of the counting chain, selectively engages one of the two timing pulses inputs. With the switch 26 in the position as shown, a tape timing track input 27 is placed in circuit with the counting chain. With the switch 26 in the other position, a photocell input 28 would be engaged starting with the minutes counter of the counting chain. If the tape input 27 is engaged, a timing track recorded on the magnetic tape (not shown) is utilized to activate the counter. This timing track can be recorded on the tape by means of an accurate half cycle per second square wave. In playing back this tape the half cycle per second square wave would be rectified in a full wave rectifier to generate one pulse per second to activate the seconds counter of the counting chain. If the switch 26 were in the other position, that is the photocell input position, another method of generating timing pulses can be utilized. In this latter method the timing track is not recorded on the tape but a disc (not shown) is mounted on the supply reel shaft of the playback transport. Translucent slots are made in the disc and a light beam passing through the disc to the photo conductive tube (not shown) is utilized to obtain the necessary timing pulses. The angular rotation of the reel containing the tape is known so the slots can be placed at the equivalent one minute mark intervals to generate the necessary timing pulses. Although this latter method is less accurate than the former method of utilizing a timing track recorded on tape, for many purposes it is sufficiently accurate, since the tape is being played back in the same manner in which it was recorded.

In the present embodiment of the invention the tape recorder (not shown) is a self-operating magnetic tape event recorder which is capable of continuously monitoring certain physical phenomena occurring over a period of twenty days and recording this physical phenomena as events on one reel of tape. The speed of the tape reel is regulated to produce one revolution per each ninety minutes of elapsed time by means of an escapement mechanism and thus in playback it is known that each complete rotation of the tape supply reel is equivalent to ninety minutes of elapsed time.

The day, hour and minute of a particular external physical event occurrence is required to be printed. Upon the occurrence of this physical event a data anticipation signal 29 is supplied to a sequencer control circuit 31. The sequencer control circuit initiates a cycle generating a predetermined sequence of control pulses, part of which include a reset pulse on a reset line 32 to reset a buffer memory 33. The buffer memory 33 has the same capacity as the minutes-units counter 17 and the contents of the minutes-units counter 17 is transferred to the buffer memory 33 by means of a control pulse from the sequencer 31 on a set line 34. This transfers the count of the minutes-units counter to the buffer memory counter and allows the minutes-units counter 17 to continue counting the timing input impulses.

At the same time that the set pulse is generated on the set line 34 a carry pulse buffer control pulse ($\overline{G}_0$) is generated on $\overline{G}_0$ line 36. This $\overline{G}_0$ pulse breaks the direct connection between the minutes-units counter 17 and the minutes-tens counter 18 and places the carry pulse buffer logic circuit 19 in a series connection with the minutes-units counter 17 and the minutes-tens counter 18. This carry pulse buffer circuit 19 contains the logic for connecting and disconnecting itself and also contains a single stage counting unit to receive the overflow of the minutes units counter 17, if there be one. At the completion of the printout cycle, controlled by sequencer 31, if the minutes-units counter 17 has overflowed and stored a pulse in the carry pulse buffer memory 19, then the logic circuit contained within the circuit transfers this stored pulse to the minutes-tens counter 18 and also re-establishes the direct connection between the minutes-units counter 17 and the minutes-tens counter 18. This restores the counting chain to the same count as there would have been if the printout cycle did not interrupt the counting chain. The use of the carry pulse buffer circuit 19 eliminates the need for a separate buffer memory for each of the minutes tens, hours and days counters, thus resulting in a simplification of the necessary circuitry.

The need for a buffer memory or the stopping of the counter during printout is required since a single overflow pulse from the minutes units counter 17 can change one or all the counters, and thereby result in an erroneous printout or a nonexistent time. As an example, assume that the counter registers nine days, twenty-three hours, and fifty-nine minutes. On the next occurrence of a minute pulse, the counter would change to ten days, zero hours and zero minutes thereby effecting a change in each counter unit with the likelihood of garbling the numerals being printed out. This could cause a nine to appear as an eight. The time required for the printout cycle is less than the time required to change the minutes-units counter 17 ten times, thus the use of a single stage carry buffer storage eliminates the need for a plurality of duplicate buffer storage units for a large portion of the counter stages.

The days-units counter 23, the hours-tens counter 22, the hours-units counter 21, the minutes-tens counter 18 and the buffer memory 33, containing the minutes-units digit, all connect to a plurality of scanning input gates 37. The scanning input gates 37 have five control signals $L_1$–$L_5$, originating from sequencer control circuit 31. These control signals, $L_1$–$L_5$ are sequentially, on a time basis, generated in the sequencer control circuit 31 to enable gating circuitry to transfer the binary information stored on each respective counter to a block transformation circuit 38.

The block transformation circuit 38 channelizes the binary information into a series of block pulses $B_1$–$B_7$. The block pulses, $B_1$–$B_7$, are an arbitrary division of the Arabic numeral notation into seven discrete blocks or segments as will be more fully explained in relation to FIG. 4.

The outputs $B_1$–$B_7$ from the block transformation circuit 38 are fed as a set of inputs to a time zone transformation circuit 39. A second set of inputs to the time zone transformation circuit 39 originates in the sequencer control circuit 31 and as indicated as $G_1$, $\overline{G}_1$, $G_2$, $\overline{G}_2$, $G_3$ and $\overline{G}_3$. Within the time zone transformation circuit 39, these latter timing signals are combined to generate a series of five time zones representative of various portions of the Arabic digit. As in the case of block transformation the time zones are arbitarily assigned zones of the Arabic digit to indicate discrete portions of the numeral. This will be more fully explained in relationship with FIG. 3. The time zone transformation circuit generates an output of one or more printing signals $P_1$–$P_3$, which are fed to a plurality of scanning output gates 41.

The timing signals $L_1$–$L_5$ are also fed in as inputs to the scanning output gates 41. These timing signals, $L_1$–$L_5$, are the same signals as fed to the scanning input gates 37. The timing signals $L_1$–$L_5$ indicate from which counter the signals originate, i.e. minutes- tens counter 18 or, hours-units counter 21, etc. and channelize the pulses to the proper combination of styli indicated by outputs $S_1$–$S_{16}$.

The styli outputs $S_1$–$S_{16}$ are inputs to a printer 42. The primary pulses stored in each respective counter are thus channelized through the circuitry and transformed to produce a pulse output upon the styli $S_1$–$S_{16}$ of the printer which causes a dot to be burned in the moving chart paper. Also a $P_n$ signal 43 is fed as an input to the printer 42. This $P_n$ signal originates in the sequencer control circuit 31 which times the printing on the moving chart paper of the printer. Another input to the printer 42 is a $C_m'$ signal 44 originating in the sequencer control circuit 31 which initiates and controls the motion of the chart paper once a numeral has initiated the printing operation. This prevents the partial printing of a numeral, insures the completion of the printing cycle once it has begun, and provides a space between the printed numerals.

The sequencer control circuit 31 has an input 45 from the tape transport which indicates that a tape is being played and this signal together with the data anticipation signal on line 29 initiates the cycle of operation of the sequencer control circuit 31.

GENERAL THEORY

Figure 2:
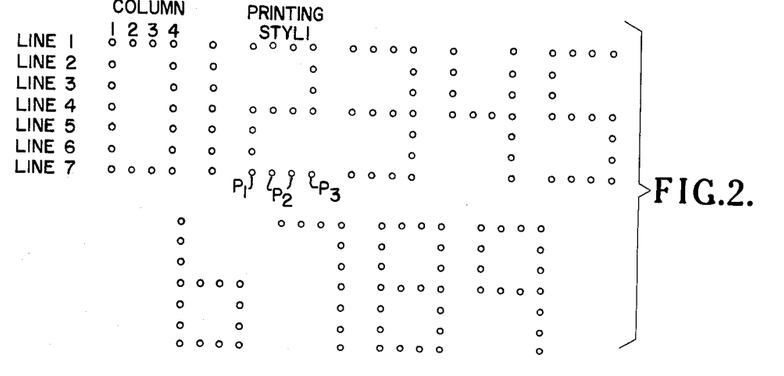
FIG. 2 is an illustration of the Arabic numeral notation format utilized by the printer.

FIG. 2 illustrates the format utilized in printing the Arabic numeral notation of the digits 0–9 by the printer of the present invention. The digits are divided into a matrix consisting of seven lines and four columns. By designating the proper line and the proper column a dot can be printed in the proper place to form a portion of the numeral desired to be printed. The entire set of numerals is arranged in a block formation with the numeral 8 being the most comprehensive, that is, the numeral 8 utilizes all of the dots utilized in the production of all of the other numerals. It should also be noted that any time a dot appears in column 2 a similar dot appears on the same line in column 3, thus one impulse can be utilized to energize the styli in both columns 2 and 3. In the printing of the numerals as the chart moves along, line 1 of a particular number is first printed with all of the dots appearing on that particular line in the various columns 1–4 being printed simultaneously. In sequence lines 2–7 are then printed as the chart continues motion. Since the dots appearing in FIG. 2 are representative of the printer pulses and since columns 2 and 3 are identical, we may designate column 1 the $P_1$ print column, columns 2 and 3 the $P_2$ print column, and column 4 the $P_3$ print column. By designating the proper line number plus the proper combinations of $P_1$, $P_2$, and $P_3$, the coordinates of the line and column can be determined. In order to print any single Arabic digit the counter storing the binary information will be sampled at seven separate and distinct time intervals, one for each line 1–7.

Figure 3:
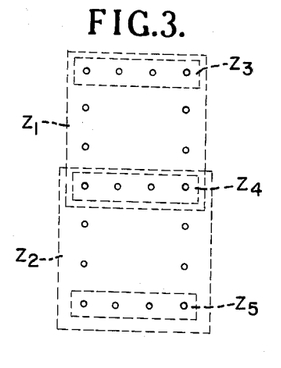
FIG. 3 is an illustration of the various time zones utilized in printing the figures of FIG. 2.

FIG. 3 denotes the arbitrary time zones defined in printing any Arabic numeral notation. In FIG. 3 time zone 1, designated as $Z_1$, shown by the dashed block form, includes all of the dots in the upper portion of the numeral eight written in the Arabic notation. In a similar manner time zone $Z_2$ includes all of the dots in the lower portion of the numeral eight. $Z_3$, indicated by the dashed lines, includes all of the dots in the upper horizontal bar of the numeral eight, $Z_4$ includes all of the dots in the center horizontal line of the numeral eight, and $Z_5$ includes all of the dots on the lower horizontal bar of the numeral eight. It will be noted that the zones are not separate and distinct, but that they are overlapping and somewhat redundant.

Figure 4:
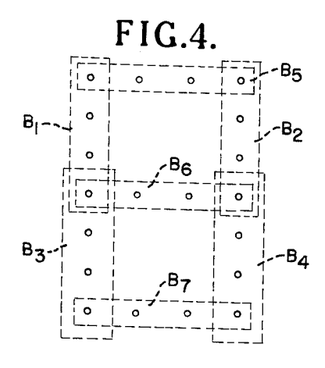
FIG. 4 is an illustration of the various blocks utilized in constructing the numerals of FIG. 2.

FIG. 4 illustrates the seven arbitrary blocks or segments of an Arabic digit defined to construct the numerals in the Arabic numeral notation. Block 1, designated as $B_1$, includes the upper portion of the vertical column of dots on the left-hand side of the numeral eight. Block 2, designated $B_2$, in a similar manner includes the dots on the upper portion of the vertical column of the numeral eight on the right-hand side. Likewise, block $B_3$ includes the dots on the vertical column on the lower left-hand portion of the numeral eight; block $B_4$ includes the dots in the vertical column on the right-hand side in the lower portion of the numeral eight. Block $B_5$ includes all of the dots on the uppermost horizontal bar of the numeral eight; block $B_6$ includes all of the dots on the horizontal middle bar of the numeral eight; and block $B_7$ includes all of the dots on the lower horizontal bar of the numeral eight. It will be noted that the blocks $B_1$–$B_7$ are not separate and discrete, but are overlapping and somewhat coinclusive.

By utilizing the $P_1$–$P_3$, the $Z_1$–$Z_5$, and the $B_1$–$B_7$, terms defined in the foregoing paragraphs, the following equations in Boolean algebra can define any numeral in the Arabic numeral notation by utilizing a time divided sampling of the binary contents of the particular storage counter.

$$P_1 = P_2 + Z_1B_1 + Z_2B_3 \quad (1)$$
$$P_2 = Z_3B_5 = Z_4B_6 + Z_5B_7 \quad (2)$$
$$P_3 = P_2 + Z_1B_2 + Z_2B_4 \quad (3)$$

As an example, take the numeral 5 which would combine the following time zones $Z_1$–$Z_5$ and blocks $B_1$–$B_7$ to produce the print signals $P_1$–$P_3$ to satisfy Equations 1, 2 and 3.

Table I
SUFFICIENT CONDITIONS FOR PRINTING DOTS TO FORM THE NUMERAL FIVE

|         | $P_1$    | $P_2$    | $P_3$    |
|---------|----------|----------|----------|
| Line 1  | $P_2$    | $Z_3B_5$ | $P_2$    |
| Line 2  | $Z_1B_1$ |          |          |
| Line 3  | $Z_1B_1$ |          |          |
| Line 4  | $P_2$    | $Z_4B_6$ | $P_2$    |
| Line 5  |          |          | $Z_2B_4$ |
| Line 6  |          |          | $Z_2B_4$ |
| Line 7  | $P_2$    | $Z_5B_7$ | $P_2$    |

Table I illustrates the time zones $Z_1$–$Z_5$ and blocks $B_1$–$B_7$ which would be simultaneously energized in the one condition to produce a $P_1$–$P_3$ print pulse to form a dot at any particular position. In the actual printing line 1 is printed, then line 2, and continues through line 7. The blank spaces indicate the absence of the simultaneous one condition of the $Z_1$–$Z_5$ and $B_1$–$B_7$ pulses so that no $P_1$–$P_3$ signal is produced. It will be noted that the filled in portions of the Table form the numeral 5 as shown in FIG. 2.

In summary, each time a particular counter is sampled all of the possible blocks of FIG. 4 capable of being utilized are formed, while the zones $Z_1$–$Z_5$ to FIG. 3 are dependent upon the particular line being energized. The combination of the two particularly define the coordinates of the dots to be printed on the moving chart paper.

Detailed description

Figure 5:
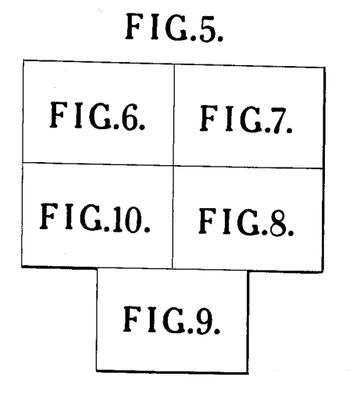

FIG. 5 illustrates the manner of joining FIGS. 6–10 in the proper fashion to obtain a continuous and integral circuit in a detailed block diagram form of the present printer. In the reference numerals used in FIGS. 6–10, the first digit or digits will indicate which figure of the drawing wherein the element appears.

Numerous flip-flops are shown in block diagram form in FIGS. 6–10. The flip-flops utilized throughout the circuitry are of the well known transistorized type. When the flip-flop is in the one state, the one output is at a potential of —20 volts, hereinafter referred to as a negative potential, and the zero output is at ground potential, hereinafter referred to as a positive potential. When the flip-flop is in the zero state, the zero output is at a potential of —20 volts, and the one output is at ground potential. Each of the flip-flops contain an S+ input through which a positive pulse will set the flip-flop in the one condition; an R+ input through which a positive input pulse will reset the flip-flop in the zero state; and a C input, which is known as a complement input, in which a positive pulse or step will change the state of conduction from a one to zero or a zero to one, as the case may be. In addition to the positive pulse inputs just named, each flip-flop contains: an R— input in which a negative input pulse will reset the flip-flop in the zero state; an S— input in which a negative set pulse will set the flip-flop in the one state; and an MR— input terminal in which a common negative pulse is utilized to reset a series of flip-flops in the zero state. The negative input terminals each contain an isolating diode in order to prevent the trailing edge of the input pulse from resetting the flip-flop once it has been set in the desired condition.

The various AND gates appearing throughout the circuitry are constructed of diodes arranged so that a negative pulse at all inputs will produce a negative output; or if the diodes are reversed a positive pulse at all inputs will produce a positive output, as the case may be. The various OR gates appearing throughout the circuitry are one of two types identical in construction to the AND gates, but biased in such a manner so that either a negative input to at least one of the terminals will produce a negative output, or a positive input to at least one of the diodes will produce a positive output, as the case may be.

COUNTERS

Figure 6:
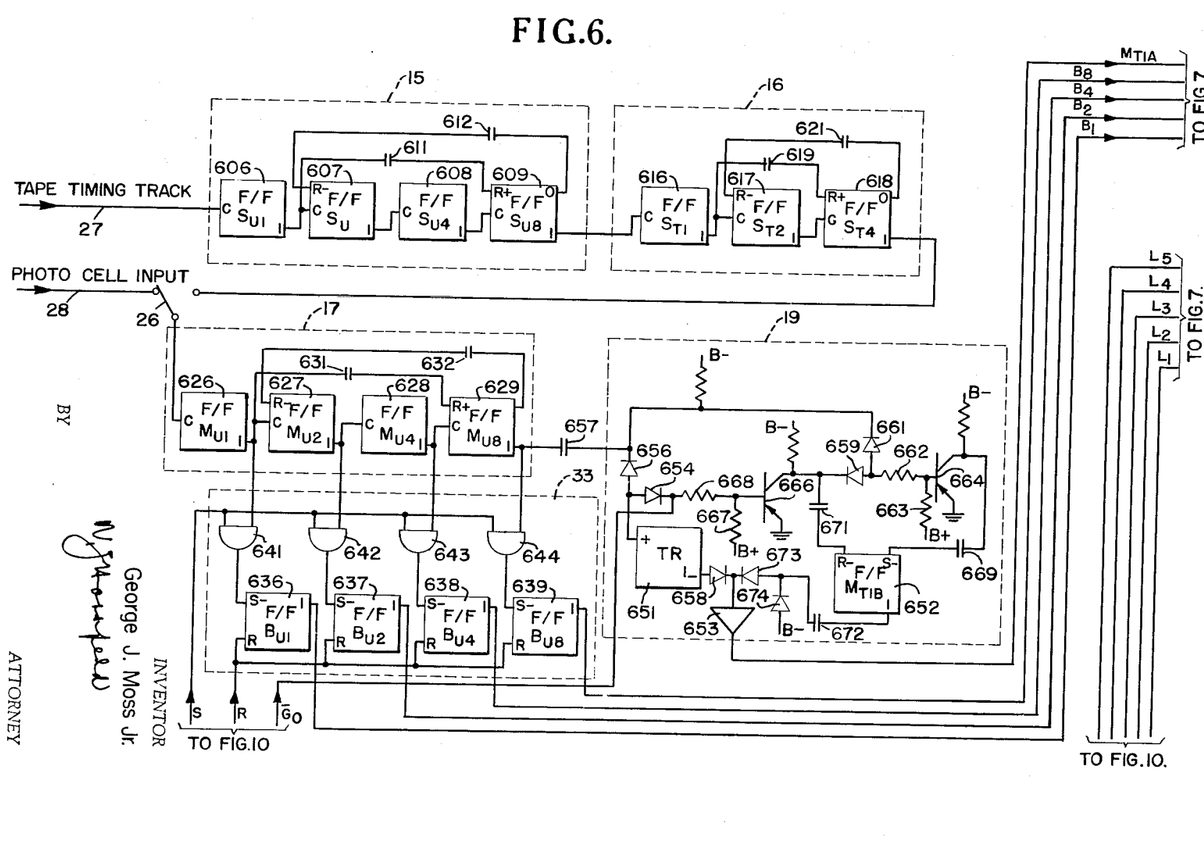
FIG. 6 illustrates a portion of the counting chain including the buffer storage and carry pulse buffer storage and attendant logic.

Referring to FIG. 6 the seconds-units counter 15, a scale of ten counter, is shown having the tape input 27 for delivering positive input pulses to flip-flop 606. The seconds-units counter 15 is constructed of four flip-flops cascaded in series and modified to be a scale of ten counter. Flip-flops 606–609 are additionally identified as $S_{u1}$, $S_{u2}$, $S_{u4}$, and $S_{u8}$ stages respectively. The S designates seconds counter, the subscript u designates units and the subscript numeral designates the binary stage of the counter. The one output of flip-flop 606 is connected to the R+ input of flip-flop 609 and has a capacitator 611 connected in the circuit to differentiate the positive output step of flip-flop 606, as the state of flip-flop 606 changes from the one to the zero condition, to reset flip-flop 609. The zero output of flip-flop 609 is connected through a capacitor 612 to the R— input of flip-flop 607. The change of condition of flip-flop 609 from the one to the zero state will produce a negative step at the zero output. This step will be differentiated by the capacitor 612 and applied to the R— input of flip-flop 607 to reset the latter flip-flop in the zero state. Additionally, the one output of each of the flip-flops 606–609 is connected to the complement input of the succeeding flip-flop in the series cascaded chain. The positive step produced upon the change of condition from the one to zero state changes the condition of the succeeding flip-flop from the one to zero state or the zero to one state, as the case may be.

*Table II*

OPERATION OF SECOND-UNITS COUNTER

| Number of Pulses Received | Final State of Flip-Flops | | | |
|---|---|---|---|---|
| | F/F 609 | F/F 608 | F/F 607 | F/F 606 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 10 | 0 | 0 | 1 | 0 |
| 10 | 0 | 0 | 0 | 0 |

Prior to the beginning of all counting, all stages in the counting chain are set in the zero state by a negative reset pulse through circuitry not shown and generally well known in the art.

From Table II it will be noted that the seconds-units counter 15 operates in the normal manner in counting from zero to nine. A positive pulses is produced each time flip-flop 606 changes from the one to the zero state and a positive reset pulse is applied to flip-flip 609. This does not alter the condition of the flip-flop 609, since it is already in the reset condition initially. With the counter storing the count of nine the next pulse changes the flip-flop 606 from the one state to the zero state, producing a positive step to set flip-flop 607 as shown in Table II. This same step resets flip-flop 609 in the zero condition as shown in Table II. The resetting of flip-flop 609 in the zero condition produces a negative step on the zero output which is differentiated by capacitor 612 and resets flip-flop 607 as shown in Table II. This resetting of flip-flop 607 returns it to the zero state, so that all the flip-flops in this counter are now in the zero state. Thus the pulse, arriving with the counting chain storing the count of nine, first changes flip-flop 606 from the one to the zero state which produces a positive pulse to change flip-flop 607 from the zero to the one state and at the same time applies a positive reset pulse to flip-flop 609 to change the state of this flip-flop from the one to the zero state. The changing of the flip-flop 609 from the one to the zero state produces a negative step output which is fed back to flip-flop 607 to return the flip-flop 607 from the one to the zero state. This sequence of events is shown in Table I following the 10th pulse, and the final condition is identical to the 0 state.

The seconds-tens counter 616, enclosed within the dashed lines, is a scale of six counter having three flip-flops 616, 617 and 618, respectively, cascaded in series. The flip-flops 616–618 are designated $S_{t1}$, $S_{t2}$, and $S_{t4}$ in accordance with the notation described hereinbefore.

Flip-flop 616 changes it state of conduction each time a positive step is received by its complement input from flip-flop 609 of the seconds-units counter 15. At the same time that flip-flop 609 is reset by the positive input pulse from flip-flop 606, a positive step is produced on the one output. The seconds-tens counter, being a scale of six counter, operates as a normal cascaded counter for the numerals 1 through 5. The transistion from 5 to 0 utilizes the principle explained in connection with the seconds-units counter 15. For the fifth count, flip-flop 616 is in the one state, flip-flop 617 is in the zero state, and flip-flop 618 is in the one state. Upon receipt of the next input pulse, flip-flop 616 is changed to the zero state of conduction, flip-flop 617 is changed from the zero to the one state. At the same time a positive step is applied through capacitor 619 to reset flip-flop 618 from the one state to the zero state, thereby producing a positive step at the one output and a negative step at the zero output. The negative step at the zero output is differentiated through capacitor 621 and resets flip-flop 617 from the one state back to the zero state so that the resulting states of flip-flops 616–618 are zero and an output step is produced for the next succeeding counter stage.

The position of switch 26 determines whether the output from the seconds-tens counter 16 is applied to the minutes-units counter 17 or whether the photo cell input 28 is applied through switch 26 to the input of the minutes-units counter. The minutes-units counter 17 is a scale of ten counter having flip-flops 626–629 and capacitors 631 and 632 to differentiate the pulses to produce only a sharp pulse for triggering the reset. The operation and construction of the minutes-units counter 17 is identical to the operation of the seconds-units counter described hereinbefore.

Figure 10:
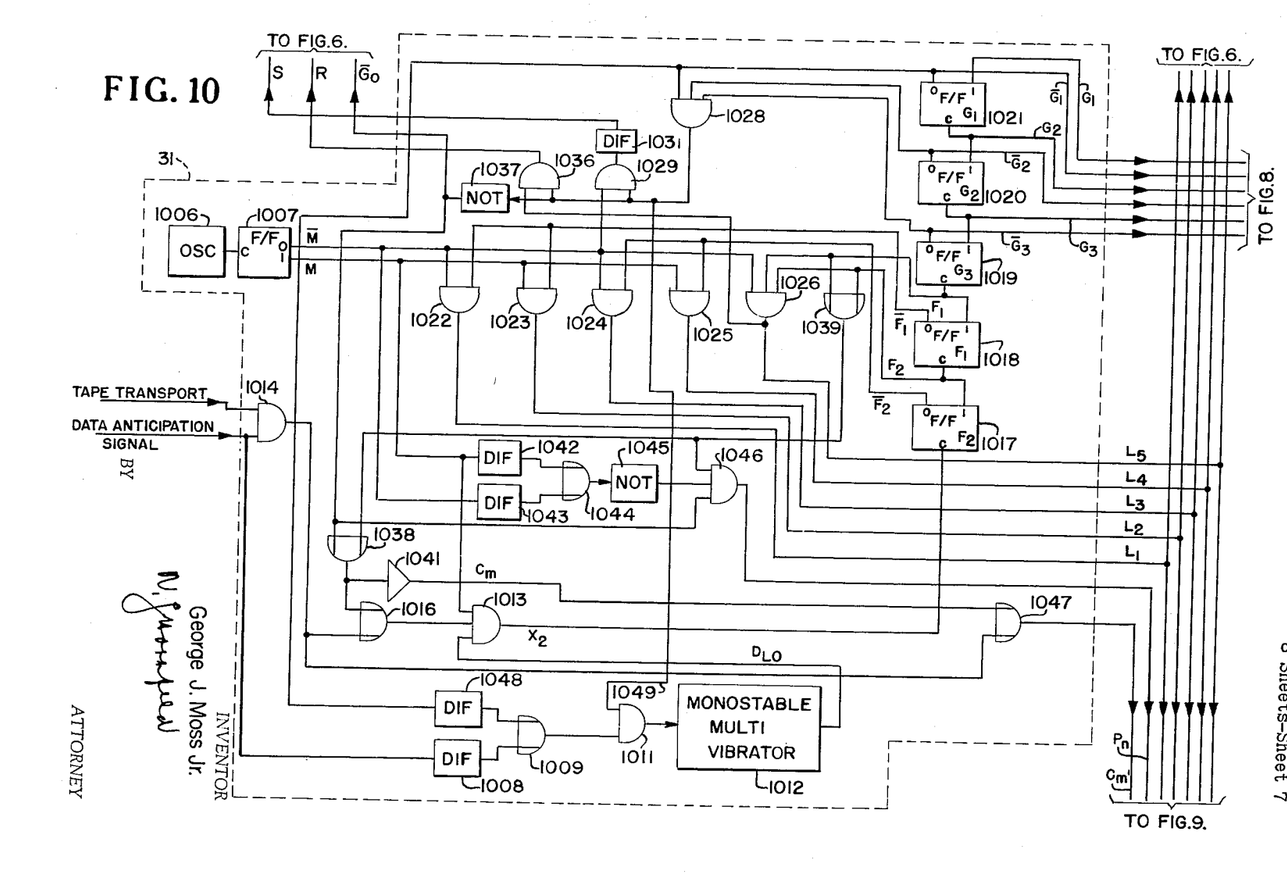
FIG. 10 illustrates the squencer timing control circuitry for the entire printer.

The buffer memory 33, enclosed within the dashed lines, includes four flip-flops, 636–639. At the proper time a negative pulse is generated by the sequencer, FIG. 10, to simultaneously reset flip-flops 636–639 to the zero state. After the flip-flops have been reset a negative set pulse generated by sequencer, FIG. 10, is applied simultaneously to one terminal of gates 641–644. At that time flip-flops 626–629 nondestructively transfer their information in parallel fashion to flip-flops 636–639, respectively. The flip-flops in the one condition produce a negative output and this, combined with the negative set pulse, produces a negative input pulse to the S-terminals of the flip-flops 636–639, thereby transferring the contents of the flip-flops 626–629, to the flip-flops 636–639. The flip-flops 636–639 produce a negative output whenever they are in the one state and they remain in that state until reset by a proper pulse from the sequencer, FIG. 10.

Figure 7:
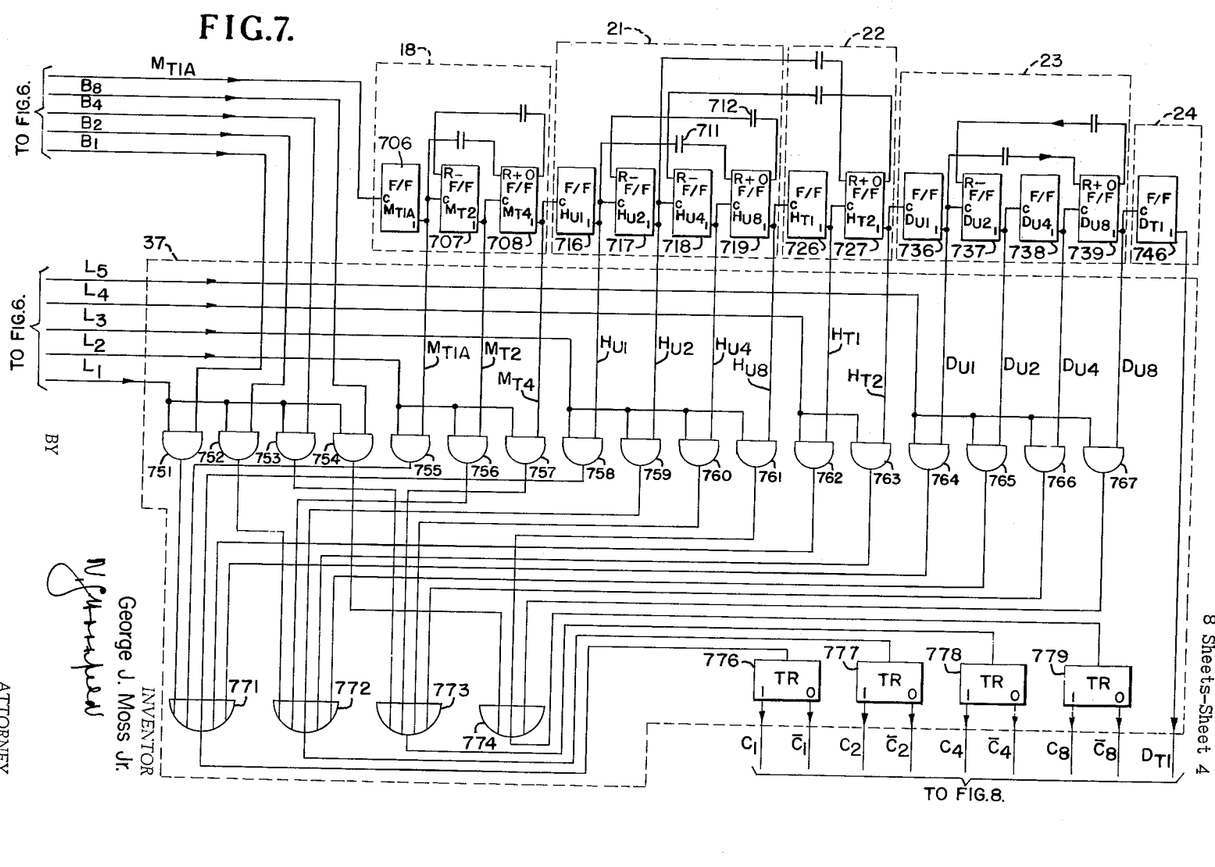
FIG. 7 illustrates the remaining portion of the storage counter and part of the logical gating circuitry.

The carry pulse buffer storage and transfer circuit 19, contained within the dashed lines, has a Schmitt trigger 651 for normally connecting the output of the minutes-units counter 17 to the minutes-tens counter, FIG. 7, through amplifier 653. When the printer is in the output mode, that is, printing an Arabic numeral, the minutes-tens counter and succeeding stages are disconnected from the minutes-units counter and flip-flop 652 is utilized to temporarily store the output from the minutes-units counter 17 until the cessation of the printing process. Upon completion of the printing process, flip-flop 652 transfers the overflow pulse, if it has received one, to the minutes-tens counter, FIG. 7, through the amplifier 653.

In the condition when the printer is not printing out, the minutes-units counter 17 is connected to the minutes-tens counter 18. A positive $\overline{G}_0$ step is produced by the sequencer, FIG. 10, and prevents conduction of diode 654. Diode 656 is in the conducting state since the input of the Schmitt trigger 651 is positive. This condition makes the anode of diode 656 more positive than the cathode, which is connected to a source of negative potential. The capacitor 657 isolates the minutes-units counter from the carry pulse buffer transfer and storage circuit 19. The minutes-units counter flip-flop 629 is in the one state producing a negative output until the count of ten at which time the changing of flip-flop 629 from the one to zero state produces a positive step which is differentiated by capacitor 657. The resulting pulse is momentarily passed by diode 656 to the input of Schmitt trigger 651. Schmitt trigger 651 is normally in the one state producing a negative output, however, upon the input of a positive pulse, the trigger momentarily changes from the one to the zero state to produce a positive output pulse which is passed by diode 658 and is amplified by saturated amplifier 653 and applied to the first stage of the minutes-tens counter 18. The trigger 651 changes states only momentarily, and then returns to the stable state, ready to accept the next positive pulse from the minutes-units counter.

Under these conditions diode 659 is conducting due to the positive bias on the anode and the negative bias on the cathode. Also under these conditions, diode 661 is clamped in a nonconducting state due to the conduction of diode 659, since its cathode is more positive than its anode. The ratio of resistors 662 and 663 is such that under these conditions PNP transistor 664 is conducting in the saturated condition. The positive condition of $\overline{G}_0$ prevents the conduction of PNP transistor 666 due to the positive bias on its base.

Thus, the clamping of diode 661 prevents any input pulses from the minutes-units counter 17 to enter this section of the circuitry, while the conduction of diode 656 allows the pulses from minutes-units counter 17 to momentarily change the state of conduction of Schmitt trigger 651 to pass the pulses to the minutes-tens counter.

When the printer is in a print-out operation, a negative $\overline{G}_0$ is produced by the sequencer, FIG. 10, diode 654 is in the conducting state and clamps diode 656 in a nonconducting state. The ratio of resistor 667 to 668 is such that the negative $\overline{G}_0$ maintains PNP transistor 666 in the conductive state, putting the cathode of diode 659 at a positive potential. Under these conditions diode 661 is conducting so that the anode of diode 659 is more negative than the cathode of diode 659, preventing conduction of this diode. The ratio of resistor 662 and 663 is such that PNP transistor 664 is still conducting at the saturation level.

Under these conditions, a change in the flip-flop 629 from the one to zero state produces a positive pulse which will not pass through diode 656 due to the clamping action of diode 654, but will pass through diode 661. The passing of the pulse momentarily through diode 661 changes the state of conduction of PNP transistor 664 from the conducting to the nonconducting state. This change of state in the transistor causes a negative pulse to appear on the collector of the PNP transistor 664. This negative pulse is passed by capacitor 669 and is applied to the S-input of flip-flop 652 to set this flip-flop in the one state. After the momentary change of the state of PNP transistor 664, the transistor returns to its original state of conduction and is ready for the next pulse.

The print-out operation, however, is of such duration that the cycle of print-out will be completed before another pulse appears, that is, the time required for print-out is less than the time required for the minutes-units counter to change states ten times, as would be required for another output pulse.

At the cessation of the print-out operation $\overline{G}_0$ returns to a positive condition, changing the state of PNP transistor 666 from the conducting to the nonconducting state. This change of state of conduction causes a negative step to appear at the collector of this transistor. This negative step is differentiated by capacitor 671 and applied to the negative reset input of flip-flop 652. If a carry pulse has been stored in the flip-flop 652, the resetting of flip-flop 652 produces a positive output signal which passes through capacitor 672 and diode 673 to be amplified by saturated amplifier 653, and applied to the minutes-tens counter.

When flip-flop 652 is in a zero state, the one output is positive, but diode 673 is not conducting due to the presence of capacitor 672. When the flip-flop changes from zero to one state, a negative step appears at the one output terminal of flip-flop 652 which passes through capacitor 672 and causes conduction of diode 674 to rapidly discharge capacitor 672.

The changing of $\overline{G}_0$ from the negative to the positive state passes a noise pulse through the internal shunt capacitance of diode 654. However, the amplitude of this noise pulse is less than the amplitude of a signal pulse. The Schmitt trigger 651 rejects this pulse and does not change the state of conduction and no output pulse is produced at this transition.

Thus, when the printer is in a print-out sequence, the circuitry connected with flip-flop 652 acts in two stages; the first stage being to set the flip-flop in one condition, and the second stage being to reset the flip-flop at the end of the print-out period to produce an output pulse which is transmitted to the minutes-tens counter. Coincidentally with the transmitting of the stored pulse, if there be a stored pulse, the carry pulse buffer circuit 19 is put in the one state in which the minutes-units counter 17 is directly connected through Schmitt trigger 651 to the minutes-tens counter.

Refering now to FIG. 7, the minutes-tens counter 18 receives positive input steps from the minutes-units counter 17 through the carry pulse circuit 19. The minutes-tens counter is a scale of six counter comprising three flip-flops 706–708 and is identical in construction and operation with the seconds-tens counter 16, described hereinbefore.

The hours-units counter 21 is a scale of 10 counter having flip-flops 716–719 together with capacitor 711 and 712 to form a scale of ten counter. The hours-tens counter 22 is a two-stage counter having flip-flops 726 and 727 which cooperate with the hours-units counter 21 to produce a scale of 24 counter.

*Table III*

SCALE OF TWENTY FOUR COUNTER OPERATION

| Number of Pulses Received | Final State of Flip-Flop | | | | | |
|---|---|---|---|---|---|---|
| | F/F 727 | F/F 726 | F/F 719 | F/F 718 | F/F 717 | F/F 716 |
| 22 | 1 | 0 | 0 | 0 | 1 | 0 |
| 23 | 1 | 0 | 0 | 0 | 1 | 1 |
| 24 | 1 | 0 | 0 | 1 | 0 | 0 |
| 24 | 0 | 0 | 0 | 1 | 0 | 0 |
| 24 | 0 | 0 | 0 | 0 | 0 | 0 |

Table III illustrates the contents of the various flip-flops in counting from the numeral 22 through 24 which is equal to 0. The hours-units counter acts as an ordinary scale of 10 counter, as described hereinbefore, and the hours-tens counter acts as an ordinary binary counter, until the numeral 23 is stored and the next digit arrives. In accordance with the principles already enunciated, with the numeral 23 stored, the next positive pulse into flip-flop 716 changes this from the one to zero state and causes an output to change flip-flop 717 from the one to zero state. Since flip-flop 719 is already in the zero state the reset pulse produces no result. The changing of the flip-flop 717 from the one to zero state produces an output which changes flip-flop 718 from zero to the one state and at the same time provides a reset pulse to flip-flop 727 to reset this flip-flop. This produces a positive output on the one terminal, and a negative output on the zero terminal which is fed back to reset flip-flop 718 from the one to the zero state. Thus, the hours-units and hours-tens counter is reset to the zero condition, and a carry pulse is provided for the days-units counter.

The days-units counter 23 is a scale of ten counter, having flip-flops 736–739 connected in a series cascaded relationship. The operation of this counter is identical both in operation and construction to the seconds-units counter 15. The output of the days-units counter 23 is an input for the days-tens counter, a single stage counter. This counter consists of a flip-flop 746 and produces a negative output in the one state and a positive output in the zero state.

SCANNING INPUT GATE

The scanning input gate 37 has a plurality of AND gates 751–767, with each AND gate having one input connected to a different stage of the counting chain, starting with the buffer memory 33, proceeding through the minutes-tens counter 18, the hours-units counter 21, the hours-tens counter 22, and finally the days-units counter 23. All of the stages of the counter produce a negative output when in the one state, and a positive output when in the zero state.

A series of time spaced negative control pulses $L_1$–$L_5$, are produced by the sequencer 31. FIGS. 1 and 10, to sequentially sample the contents of the various counters in a cyclic manner. $L_1$, being the first in time, samples the buffer memory 33 through AND gates 751–754 for the minutes-units digit. Next in time sequence, $L_2$ simultaneously enables AND gates 755–757 to sample the minutes-tens counter 18. In like manner, $L_3$ enables AND gate 758–761 to sample the hours-units counter, $L_4$ enables AND gates 762–763 to sample the hours-tens counter, and finally, $L_5$ enables AND gates 764–767 to sample the days-units counter. As will be pointed out later, the sampling of each counter occurs seven different times for the printing of one complete numeral.

The output of the AND gates 751–767 selectively lead to a set of four OR gates 771–774. OR gate 771 receives all of the input pulses from the first stage of each counter, 772 receives all of the pulses from the second stage of each respective counter. In a like manner, OR gate 773 receives those from the third stage and OR gate 774 receives the inputs from the fourth stage of each counter, where applicable.

Corresponding to the four gates, 771–774, are four Schmitt triggers 776–779. OR gate 771 is connected to Schmitt trigger 776 and a negative output from 771 indicative of a one stored in the first stage of the particular counter being sampled will produce a negative potential output on the one terminal of the Schmitt trigger 776 and a positive potential on the zero output of the Schmitt trigger 776. If OR gate 771 produces a positive output indicative of a zero stored in the first stage of the counter being sampled, then the positive input to the trigger 776 would produce a positive potential out at the one output of the trigger and a negative output potential at the zero output of Schmitt trigger 776. Thus, the Schmitt trigger is utilized to give a positive indication of the state or condition of the storage stage presently being sampled. In a similar manner OR gate 772 is connected to Schmitt trigger 777, OR gate 773 is connected to Schmitt trigger 778, and OR gate 774 is connected to Schmitt trigger 779. Thus, the four Schmitt triggers 776–779, produce eight outputs indicated $C_1$, $\overline{C}_1$, $C_2$, $\overline{C}_2$, $C_4$, $\overline{C}_4$, $C_8$ and $\overline{C}_8$ to give a positive indication of the condition of the counter being sampled.

BLOCK TRANSFORMATION CIRCUIT

Figure 8:
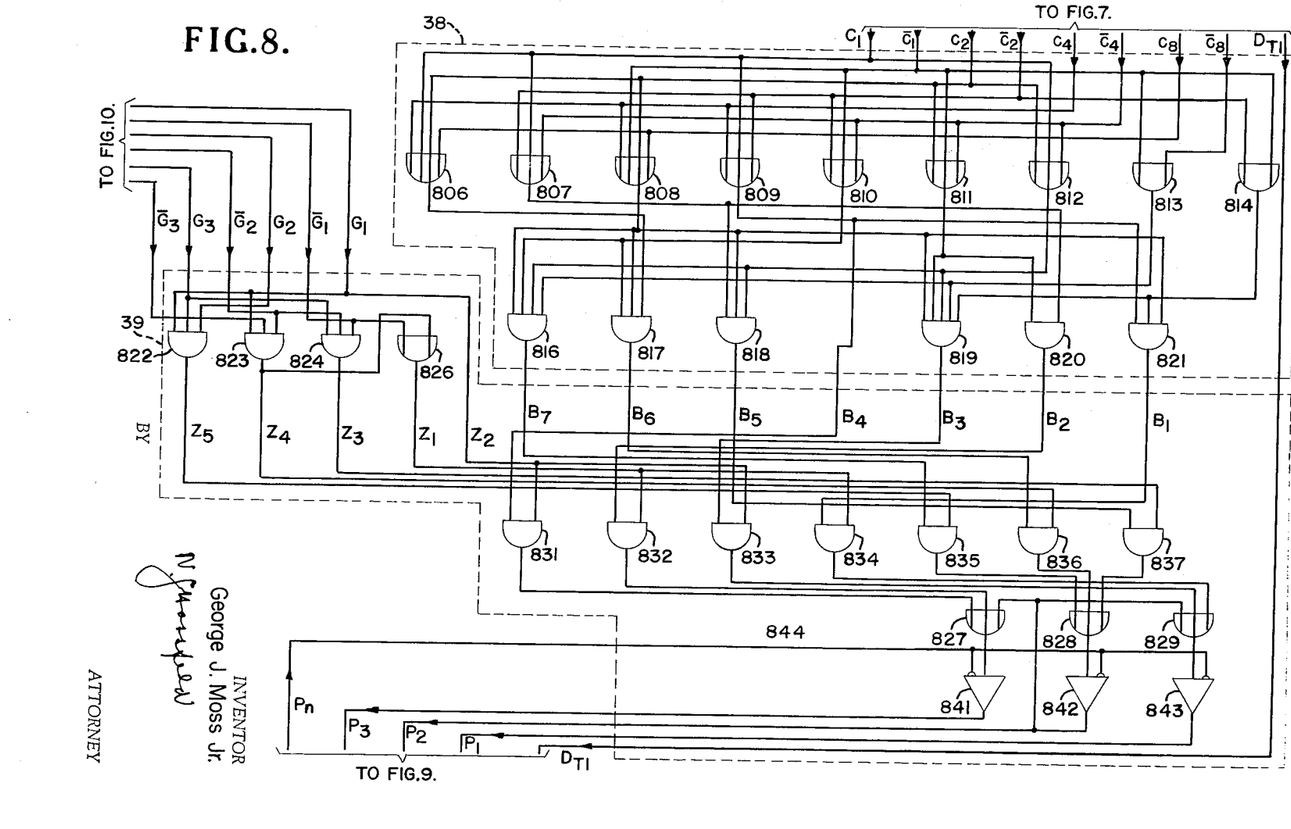
FIG. 8 illustrates the remaining portion of the logical gating circuitry for converting from the binary to the Arabic numeral notation.

Referring to FIG. 8, the block transformation circuit 38 performs the function of determining which of the blocks of FIG. 4 must be used to represent the binary count stored in any particular counter by one of the Arabic numerals defined in FIG. 2. The inputs $C_1$, $\overline{C}_1$, $C_2$, $\overline{C}_2$, $C_4$, $\overline{C}_4$, $C_8$ and $\overline{C}_8$, are the inputs to the block transformation circuit indicative of the binary count in the counter. The outputs of the block transformation counter are the outputs $B_1$–$B_7$ which are indicative of the seven blocks defined in FIG. 4. The various conditions of $B_1$–$B_7$ can be defined by the following equations in terms of the condition of the binary counter.

$$B_1 = (\overline{C}_2 + \overline{C}_1)(C_4 + \overline{C}_2 + C_1)(C_8 + C_4 + C_2 + \overline{C}_1) \quad (4)$$
$$B_2 = (\overline{C}_4 + C_2 + \overline{C}_1)(\overline{C}_4 + \overline{C}_2 + C_1) \quad (5)$$
$$B_3 = (\overline{C}_2 + \overline{C}_1)(\overline{C}_8 + \overline{C}_1)(\overline{C}_4 + C_2 + C_1)(\overline{C}_4 + C_2 + \overline{C}_1)(C_8 + C_4 + C_2 + \overline{C}_1) \quad (6)$$
$$B_4 = C_4 + \overline{C}_2 + C_1 \quad (7)$$
$$B_5 = (\overline{C}_4 + C_2 + C_1)(\overline{C}_4 + \overline{C}_2 + C_1)(C_8 + C_4 + C_2 + \overline{C}_1) \quad (8)$$
$$B_6 = (\overline{C}_4 + \overline{C}_2 + \overline{C}_1)(C_8 + C_4 + C_2 + \overline{C}_1)(C_8 + C_4 + C_2 + C_1) \quad (9)$$
$$B_7 = (\overline{C}_8 + \overline{C}_1)(\overline{C}_4 + C_2 + C_1)(\overline{C}_4 + \overline{C}_2 + \overline{C}_1)(C_8 + C_4 + C_2 + \overline{C}_1) \quad (10)$$

OR gate 806 performs the function of $C_8 + C_4 + C_2 + C_1$ in Equation 9, OR gate 807 performs the function of $\overline{C}_4 + \overline{C}_2 + C_1$ in Equations 5 and 8. OR gate 808 performs the function of $C_8 + C_4 + C_2 + \overline{C}_1$ in Equations 4, 6, 8, 9 and 10. OR gate 809 performs the function of $C_4 + \overline{C}_2 + C_1$ in Equations 4 and 7. OR gate 810 performs the function of $\overline{C}_4 + \overline{C}_2 + \overline{C}_1$ in Equations 9 and 10. OR gate 811 performs the functions of $\overline{C}_4 + C_2 + \overline{C}_1$ in Equations 5 and 6. OR gate 812 performs the functions of $\overline{C}_4 + C_2 + C_1$ in Equations 6, 8 and 10. OR gate 813 performs the functions of $\overline{C}_8 + \overline{C}_1$ in Equations 6 and 10. OR gate 814 performs the functions of $\overline{C}_2 + \overline{C}_1$ in Equations 4 and 6.

AND gate 816 combines the negative potential outputs of OR gates 808, 810, 812 and 813 and passes a negative pulse indicative of $B_7$, whenever each and every one of these OR gates produces a negative output pulse. In a similar manner AND gate 817 combines the outputs of OR gates 806, 808 and 810 to produce $B_6$. AND gate 818 combines the outputs of OR gates 807, 808 and 812 to produce $B_5$. $B_4$ does not utilize an AND gate since it is the same as the output from OR gate 809. AND gate 819 combines the outputs of OR gates 808, 811, 812, 813 and 814 to produce $B_3$. AND gate 820 combines the outputs of OR gates 807 and 811 to produce $B_2$. AND gate 821 combines the outputs of OR gates 808, 809 and 814 to produce $B_1$.

Thus, block transformation circuit 38 utilizes the condition of the binary counter to convert the binary notation to the Arabic numeral notation as defined in FIG. 4.

As an example of how the block transformation circuit converts the binary notation into the Arabic numeral notation the numeral 3 will be traced through the block transformation circuit. For the binary numeral 3 (0011 for $C_8$, $C_4$, $C_2$, $C_1$ in binary notation) the $C_1$, $C_2$, $\overline{C}_4$ and $\overline{C}_8$ will be negative potentials and $\overline{C}_1$, $\overline{C}_2$, $C_4$ and $C_8$ will be positive potentials. If any one input to an OR gate be negative then the OR gate will pass the negative potential. It will be observed that OR gates 806–813 all pass a negative potential while OR gate 814, since both inputs are positive, will have a corresponding positive output. OR gate 814 is the only gate not putting out a negative potential. The AND gates to which OR gate 814 is connected will be the only AND gates not passing a negative pulse. From the circuitry AND gates 819 and 821 will be the only AND gates not producing an output pulse while AND gates 816–818, 820 and B$_4$ will be producing a negative output. This means that blocks B$_2$, B$_4$–B$_7$ will pass a negative potential while blocks B$_1$ and B$_3$ will be blocked, that is, a positive potential output will be produced instead of a negative output. From looking at FIG. 4 and FIG. 2, it will be noted that B$_1$ and B$_3$ are the only blocks of FIG. 4 which are not utilized in printing the numeral 3 of FIG. 2.

TIME ZONE TRANSFORMATION CIRCUIT

Referring to FIG. 8, the time zone transformation circuit 39 is shown enclosed by the dashed lines. The inputs to this circuit G$_1$, $\overline{G}_1$, G$_2$, $\overline{G}_2$, G$_3$ and $\overline{G}_3$ are generated from a counter in the sequencer circuit 31 of FIG. 10. These input circuits will be utilized to define the various time zones shown in FIG. 3 and will be combined with the block outputs B$_1$–B$_7$ of the block transformation circuit to determine whether or not a dot will be printed in a given column of the Arabic numeral at any particular time.

*Table IV*

RELATIONSHIP OF LINE NUMBERS TO TIME ZONE NUMBERS

| Line No. | Binary Notation of Line Number | | |
|---|---|---|---|
| | G$_1$ | G$_2$ | G$_3$ |
| 1 | 0 | 0 | 1 ← Z$_3$ |
| 2 | Z$_1$ 0 | 1 | 0 |
| 3 | 0 | 1 | 1 |
| 4 | 1 | 0 | 0 ← Z$_4$ |
| 5 | Z$_2$ 1 | 0 | 1 |
| 6 | 1 | 1 | 0 |
| 7 | 1 | 1 | 1 ← Z$_5$ |

Table IV illustrates the relationship of the line numbers of FIG. 2 to the zone numbers of FIG. 3 based upon the binary counter in the sequencer 31, FIG. 10, which generates the outputs G$_1$, $\overline{G}_1$ ... $\overline{G}_3$. The potential generated by the binary counter is as follows: if G$_1$ be a one then G$_1$ would be a negative potential and $\overline{G}_1$ would be a positive potential, if G$_1$ be a zero G$_1$ would be a positive potential and $\overline{G}_1$ be a negative potential. From Table IV the various zones, Z$_1$–Z$_5$, can be defined in Boolean algebra in terms of G$_1$, $\overline{G}_1$ ... $\overline{G}_3$ by the following equations:

$$Z_1 = \overline{G}_1 + G_1\overline{G}_2\overline{G}_3 \quad (11)$$
$$Z_2 = G_1 \quad (12)$$
$$Z_3 = \overline{G}_1\overline{G}_2G_3 \quad (13)$$
$$Z_4 = G_1\overline{G}_2\overline{G}_3 \quad (14)$$
$$Z_5 = G_1G_2G_3 \quad (15)$$

AND gates 822–824 and OR gate 826 combine the G$_1$, $\overline{G}_1$ ... $\overline{G}_3$ inputs into the various zones Z$_1$–Z$_5$ illustrated in Table IV and defined by Equations 11–15. AND gate 822 combines G$_1$, G$_2$, and G$_3$ to produce Z$_5$. AND gate 823 combines G$_1$, $\overline{G}_2$, and $\overline{G}_3$ to produce Z$_4$; AND gate 824 combines $\overline{G}_1$, $\overline{G}_2$, and G$_3$ to produce Z$_3$. OR gate 826 combines Z$_4$, which is G$_1\overline{G}_2\overline{G}_3$ with $\overline{G}_1$ to produce Z$_1$, and no gating circuitry is used to produce Z$_2$ which is G$_1$.

AND gates 831–837 combine the various time zones Z$_1$–Z$_5$ with the various blocks B$_1$–B$_7$ to uniquely define the particular block and zone to be printed by the printer at that time. By combining the zones of FIG. 3 and the blocks of FIG. 4 AND gate 831, having inputs B$_4$ and Z$_2$, defines the lower right-hand vertical line of the numeral 8. AND gate 832 combines B$_2$ and Z$_1$ to define the upper right-hand portion of the vertical line of the numeral 8. In a similar manner, AND gate 833 combines B$_3$ and Z$_2$ to define the lower left-hand vertical line of the numeral 8, and AND gate 834 combines B$_1$ and Z$_1$ to define the upper portion of the left-hand vertical line of the numeral 8. Likewise, AND gate 835 having inputs Z$_7$ and Z$_5$ defines the lower horizontal bar of the numeral 8, AND gate 836 having inputs B$_6$ and Z$_4$ defines the center horizontal bar of the numeral 8, and AND gate 837 having inputs B$_5$ and Z$_3$ defines the upper horizontal bar of the numeral eight. At this point in the circuitry the numeral to be printed, utilizing the voltage of the binary counter, is uniquely defined in time zone and block sequence.

OR gates 827–829 combine the time zone and block transformations of AND gates 831–837 to energize the proper styli required to print the figures shown in FIG. 2 in accordance with the arbitrary time and block zones of FIGS. 3 and 4, respectively. The pulses applied to the styli, P$_1$–P$_3$, have been defined in terms of the block and zone numbers in Equations 1, 2, and 3 stated hereinbefore.

OR gate 828 produces a negative output any time a negative output is produced from AND gates 835–837 to cover the areas B$_7$Z$_5$, B$_6$Z$_4$, and B$_5$Z$_3$. OR gate 827 is connected to AND gates 831 and 832 to produce an output in the zones B$_4$Z$_2$ and B$_2$Z$_1$ and additionally, produces an output any time the P$_2$ print signal is produced in response to an output from OR gate 828. Or gate 829 is connected to AND gates 833 and 834 to produce an output indicative of zones B$_3$Z$_2$ and B$_1$Z$_1$ and additionally, produces an output any time the print signal P$_2$ is generated.

Inhibited amplifiers 841–843 amplify the output of OR circuits 827–829, respectively, whenever a positive P$_n$ print signal is not present on the inhibit terminals of the amplifiers. Stated in another way, whenever the P$_n$ print signal is negative the amplifiers 841–843 pass and amplify any signal output from the OR gates 827–829. The inhibited amplifiers 841–843, therefore, act as a combination AND gate and amplifier. The P$_n$ print signal is utilized to accurately time the printing of the figures on a moving chart as well as to prevent erratic noise signals from producing unwanted markings on the chart. The P$_n$ print signal is generated by the sequencer 31, FIG. 10.

Continuing the example of the conversion of the numeral 3 from the block transformation, circuit B$_2$ and B$_4$–B$_7$ are energized with a negative potential while B$_1$ and B$_3$ are not energized and are at a positive potential. Thus, AND gates 833 and 834 will never transmit a negative output pulse since one of the inputs, B$_3$ and B$_1$ respectively, is always positive. AND gates 831, 832 and 835–837 will pass a negative output pulse when the proper Z$_1$–Z$_5$ signal is applied. This inhibition of AND gates 833 and 834 eliminates B$_3$Z$_2$ and B$_1$Z$_1$, which are the only combinations not used to print the numeral 3 from FIG. 2. Thus at the proper times the Z signals will cause the printing of the appropriate dots whenever the necessary combinations of B and Z signals exist.

SCANNING OUTPUT GATES AND PRINTER

Figure 9:
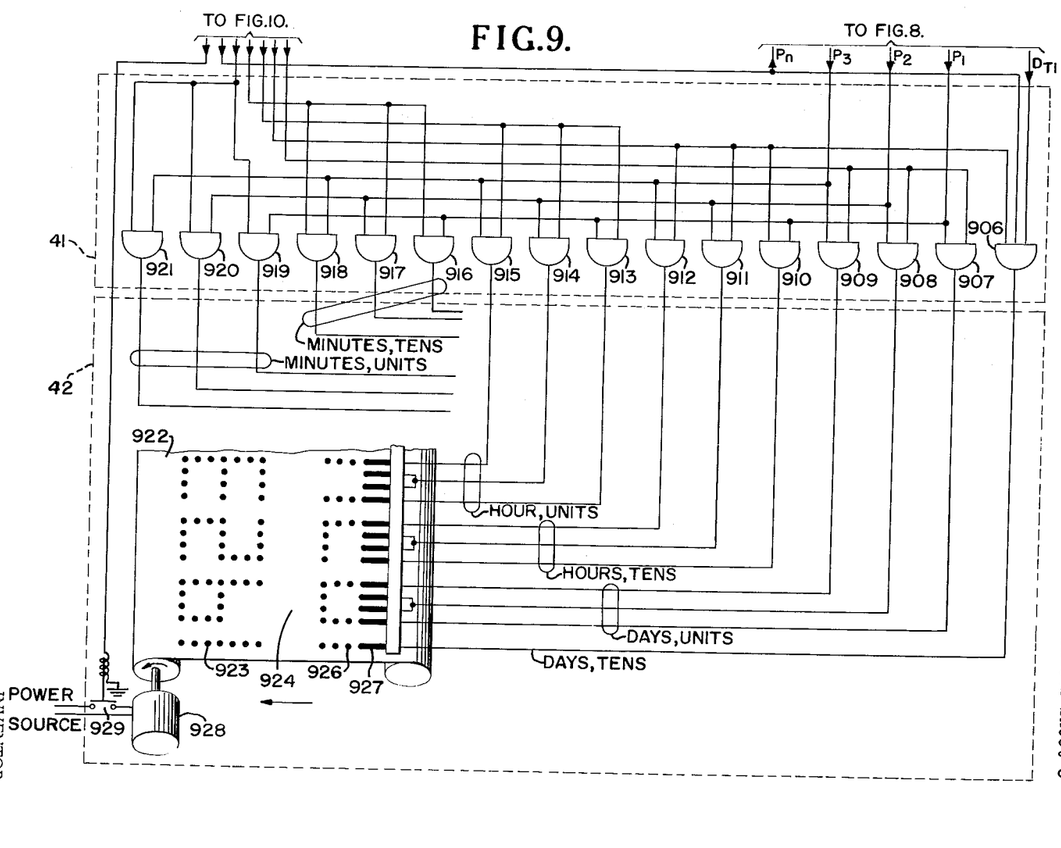
FIG. 9 illustrates the printout recorder and the styli energization gates.

Referring to FIG. 9, the scanning output gates 41, enclosed in the dashed lines, has inputs P$_1$–P$_3$ to energize the printer styli at the proper time as determined by the input L$_1$–L$_5$ generated in the sequencer unit, FIG. 10. The AND gates 906–921 are sequentially activated in accordance with the particular counter being read out as described in the description of FIG. 7. The L$_1$ signal activates AND gates 919–921, if the proper print signals, P$_1$–P$_3$, are also present, to print in Arabic numeral notation the minutes-units digit which is stored in buffer memory 33. In a similar manner AND gates 916–918 are associated with the minutes-tens counter 18 to print in Arabic notation the binary numeral presently being stored in that counter. Likewise AND gates 913–915 are activated by the negative L$_3$ signal to print-out the contents of the hours-units counter 21. The $L_4$ negative signal activates AND gates 910–912 to print the contents of the hours-tens counter 22, and also energizes AND gate 906 to print the contents from the days-tens counter 24 at the time that the print signal $P_n$ simultaneously produces a negative potential to activate the AND gate 906. AND gates 907–909 are activated by the $L_5$ input in accordance with the numerals stored in the days-units counter 23 to cause the printing out of the contents of that counter.

A chart paper 922 in printer 42 is of the type in which an electrical pulse causes a burning of the paper as the paper passes over a conductive plate positioned beneath the paper. The numerals already printed, generally indicated at 923, represent a portion of the storage counter contents printed out in the Arabic numeral notation. That which is shown would read 19 days, 23 hours. On the other portion of the paper (not shown) the minutes would be printed in a similar manner. The space 924 is provided by the sequencer unit, FIG. 10, for ease in reading the numerals. The styli 927 are presently printing the numerals shown at 926 on the chart paper 922 as the chart paper is moving. The center two dots of each numeral are printed by one printing pulse, $P_2$, while the outer columns are controlled by the printing pulses $P_1$ and $P_3$.

A motor 928 drives the chart paper 922 in the direction indicated by the arrow in accordance with the negative $C_m'$ pulse received from the sequencer, FIG. 10, which activates a solenoid to close a switch 929 thereby applying a suitable power source to the motor. The $C_m'$ signal from sequencer unit begins prior to the printing operation and a short time elapses to allow the motor to gain sufficient speed at which time the printing commences. The $C_m'$ pulse keeps the switch 929 closed until the printing of the numeral is complete, thus eliminating ambiguities and divided numerals in the printing. The minutes-units and minutes-tens styli, although not shown, print in identical manner as the hours-units, hours-tens, days-units and the days-tens styli. About twenty sets of numerals per second are capable of being printed utilizing the circuitry of this embodiment.

As shown by numerals being printed 926, first line 1, as shown in FIG. 2, is printed followed by lines 2, 3 and so on through 7. The numerals are not printed simultaneously, but first the contents of the minutes-units counter, then the minutes-tens counter, followed by the hours-units counter and sequentially through the other counters with the exception of the days-tens counter. Thus, in printing any one complete numeral the storage counter of that numeral is sampled seven different times. The direct connections from the binary counter to the printing styli through the conversion circuitry utilizes the potentials stored in the counter or memory circuit to directly print the Arabic numerals by electrical pulses.

Referring now to FIG. 10, the sequencer 31, shown in the dashed lines, controls the operation of the printer in transferring the information from the various counters to the printer where it is printed on the moving chart paper. The sequencer unit 31 generates the $L_1$–$L_5$ outputs which sample a particular storage counter and activate a particular printing channel on the chart paper. The sequencer also generates the $P_n$ print signal for gating the pulses from the counter to the printing styli as well as generating the $C_m'$ chart movement signal which controls the movement of the chart paper. In addition to these output signals, the timing signals $G_1$, $\overline{G}_1$ . . . $\overline{G}_3$ generated by the sequencer determine which line of the seven lines utilized in the printing the numeral is presently activated. The sequencer unit has two inputs from external equipment which is not shown; the one is a tape transport input which is a negative signal received when the magnetic tape transport is in motion, and the second is the data anticipation signal which is a negative signal representative of the fact that a particular event is or has happened as determined on the magnetic tape channels.

The sequencer has an oscillator 1006 for generating the timing signals which control the operation of the entire printer. The output of the oscillator is connected to a flip-flop 1007 which converts the output of the oscillator into M and $\overline{M}$ signals which are of opposite polarity and cyclically switch from one polarity to the other. A negative potential is indicative of the one condition and a positive potential is indicative of zero condition. The flip-flop 1007 constantly generates the M and $\overline{M}$ signals whether they are being utilized or not.

Assume the following conditions: that the sequencer is at the rest position, that is in a position to initiate the generation of the sequence control signals; that the tape transport is in motion and producing a negative signal which so indicates; and that a data anticipation signal is produced by the magnetic tape reproducer. The data anticipation signal, a negative signal, will be differentiated by the differentiator 1008 to produce a negative output which will pass through the OR circuit 1009 and will arrive at one of the inputs of AND gate 1011. The other input of the AND gate 1011 also has a negative signal at its terminal for reasons which will be described later. A negative output signal from AND gate 1011 will trigger a monostable multivibrator 1012, and after a short delay the monostable multivibrator 1012 returns to the stable state and produces a negative output signal designated $D_{LO}$, which is one input to the AND gate 1013.

The negative tape transport signal and the negative data anticipation signal pass through the AND gate 1014 to present a negative signal to OR gate 1016 which passes through this gate to the AND gate 1013 as a second input signal. The flip-flop 1007 connected to the oscillator 1006 is constantly producing the M signal output and in the one state a negative potential is produced which is applied as the third input to the AND gate 1013. It will be remembered that the flip-flop in the one state is at a negative potential output and when it changes to the zero state a positive potential output is produced. Upon this occurrence the AND gate 1013 output changes from a negative to a positive signal which is designated $X_2$.

The $X_2$ input is applied to the first stage of a serially-connected, cascaded counting chain consisting of five flip-flops 1017–1021. The $X_2$ signal is applied to the complement input of the flip-flop 1017, known as the $F_2$ stage, to cause a change in the state of conduction each time a positive step is applied. This flip-flop produces a one and a zero output, the one output being connected to the complement of the next succeeding stage in the counting chain, flip-flop 1018, known as the $F_1$ stage. Each time the prior stage, flip-flop 1017, changes from the one to zero state, a positive step is at the output to change the state of conduction of the flip-flop 1018. In a similar manner flip-flops 1019–1021 known as the $G_3$, $G_2$ and $G_1$ stages, respectively, each has its complement input connected to the one output of the preceding stage and is identical in operation and construction as first two stages flip-flops 1017 and 1018. The M signals produced by the flip-flop 1007 continue to pass through the AND gate 1013 to effect the counting in this counting chain. Flip-flops 1019–1021, $G_3$, $G_2$ and $G_1$ stages, generate the $G_1$, $\overline{G}_1$ . . . $\overline{G}_3$ signals which control the time zone transformation circuitry of FIG. 8. The output from the one terminal is known as the $G_1$, $G_2$ or $G_3$ output, and the output from the zero terminal is known as the $\overline{G}_1$, $\overline{G}_2$ or $\overline{G}_3$ output.

The first two stages of this counter, flip-flops 1017 and 1018 known as the $F_2$ and $F_1$ stages, respectively, utilize the one and zero outputs to combine with the M and $\overline{M}$ signals of the oscillator to produce the $L_1$–$L_5$ negative potential signals which control the sampling of the particular counter and the printing of a particular channel on the chart paper. AND gate 1022 produces the $L_1$ output upon the coincidence of the $\overline{M}$ and the $\overline{F}_1$ signal, which is the zero output from flip-flop 1018. The $L_2$ signal is produced by AND gate 1023 upon the coincidence of the M and $\overline{F}_1$ signals, and $L_3$ is a combination, within the AND gate 1024, of the $\overline{M}$ and $\overline{F}_2$ signals. AND gate 1025 produces the $L_4$ signal upon the coincidence of M and $\overline{F}_2$, while $L_5$ is the combination in the AND gate 1026 of the signals $F_1$, $F_2$ and $\overline{M}$, where the $F_1$ and $F_2$ outputs are the one outputs from the flip-flops 1018 and 1017, respectively.

The zero outputs of flip-flops 1019–1021 are combined in the AND gate 1028 and produce a negative output known as $G_0$ whenever all three stages are in the zero state, or stated in equation form: $\overline{G}_1\overline{G}_2\overline{G}_3 = G_0$. This negative $G_0$ signal is combined in AND gate 1029 with the $\overline{M}$ signal to produce a negative potential output which is differentiated in differentiator 1031 to produce a negative set pulse S utilized to set the buffer storage 33 of FIG. 6. This negative $G_0$ signal is combined with the $L_5$ signal in AND gate 1036 to produce the negative reset pulse, R, utilized to reset the buffer memory 33 of FIG. 6. This negative $G_0$ signal is also applied to NOT gate 1037 to produce a positive output $\overline{G}_0$ which controls the carry pulse buffer storage and transfer circuit 19 of FIG. 6.

This $\overline{G}_0$ signal from NOT gate 1037 is applied to OR gate 1038. The other input of OR gate 1038 is the combination of $F_1$ or $F_2$ from flip-flops 1017 and 1018 through OR gate 1039. The output of OR gate 1038 is amplified in amplifier 1041 and passed through the OR gate 1047 to produce the $C_m'$ signal to control the drive motor for the chart paper of the printer.

This signal from OR gate 1038 is passed through the OR gate 1016 to form a second input to the AND gate 1013. The first input to AND gate 1013, mentioned hereinbefore, is $D_{LO}$. If $D_{LO}$ is in the one condition and the signal from OR gate 1038 is in the one condition, then the AND gate 1013 passes the signal M from the flip-flop 1007 to the complement input of the flip-flop 1017.

If the tape reproducer is playing back, and data is present to be printed out, the signals so indicating are combined in the AND gate 1014 and passed through the OR circuit 1016 to the input of the AND circuit 1013. Thus a data present signal which occurs while the tape reproducer is playing back at any time that the signal $D_{LO}$ is in the one condition, is sufficient to connect the M output of flip-flop 1007 to the complement input of the flip-flop 1017 through the AND gate 1013.

The M and the $\overline{M}$ signals of flip-flop 1007 are differentiated in differentiators 1042 and 1043, respectively. The output of the differentiators passes through OR gate 1044 and NOT gate 1045 to be combined in AND gate 1046 with the $\overline{G}_0$ signal from NOT gate 1037 and the $F_1 + F_2$ signal from OR gate 1039. The output $P_n$ of the AND gate 1046 controls the gating of the printing styli of printer 42 of FIGS. 8 and 9.

The differentiator 1048 differentiates the zero output of flip-flop 1021, the $\overline{G}_1$ output, when this flip-flop changes state from the one to the zero condition, producing a negative pulse which is applied to OR gate 1009. The second input of AND gate 1011 is applied by wire 1049 from the $G_0$ output of AND gate 1028.

OPERATION

In operation the printer of the present invention is connected to a magnetic tape reproducer (not shown) having tape upon which certain events, occurring over a period of up to twenty days, have been recorded. This tape reproducer additionally has means for producing a pulse indicative either of each second of tape recording time, or of each minute of tape recording time. Two other outputs from the tape reproducer are required, one is indicative that the reproducer is in the play back mode and is actually playing back, and the second is an output indicative of the occurrence of an event recorded on the tape.

The tape transport output and the data anticipation pulse are applied to the sequencer of FIG. 10 and the timing pulses are applied to the counting circuit of FIG. 6. If the time pulses occur every second they are applied to the seconds-units counter 15 and the seconds-tens counter 16. If the pulses beat one pulse per minute of recording time, the pulse is applied through input 28, FIG. 6, to the minutes-units counter. The time pulses are applied to a series cascaded counting chain which counts the seconds (if applicable), minutes, hours, and days in the seconds-units counter 15, seconds-tens counter 16, and the minutes-units counter 17 of FIG. 6. Through the carry pulse buffer circuit 19 of FIG. 6 the minutes-units counter is connected to the minutes-tens counter 18 of FIG. 7. This counter in sequence is connected to the hours-units counter 21, the hours-tens counter 22, the days-units counter 23, and the days-tens counter 24. This counting chain counts the timing pulses coming in the binary notation.

Upon the appearance of data recorded on the magnetic tape, the monostable multivibrator 1012, FIG. 10, is set to the quasi-stable state by means of the signal arriving through the OR gate 1009 and the differentiator 1008. This causes the monostable multivibrator output $D_{LO}$ to go to the positive, or zero condition. If a signal confirming that the tape transport is running is present when the data anticipation signal appears, a binary one appears at the output of the AND gate 1014 and consequently at the output of the OR gate 1016 and the input of AND gate 1013.

After a preset time interval sufficient to allow the paper chart motor to build up speed, the internal circuitry of the monostable multivibrator causes it to return to its stable state. This causes its output $D_{LO}$ to go to the one condition. AND gate 1013 then has binary ones at two of its three inputs, and its output is equal to the signal M which comes from the flip-flop 1007. The signal M passes through the AND gate 1013 to the input of the five-stage counting chain consisting of flip-flops 1017–1021. This counter controls the sequence, that is, the steps taken by the printer in printing out the contents of the time unit counting chain in Arabic numeral notation.

Figure 11:
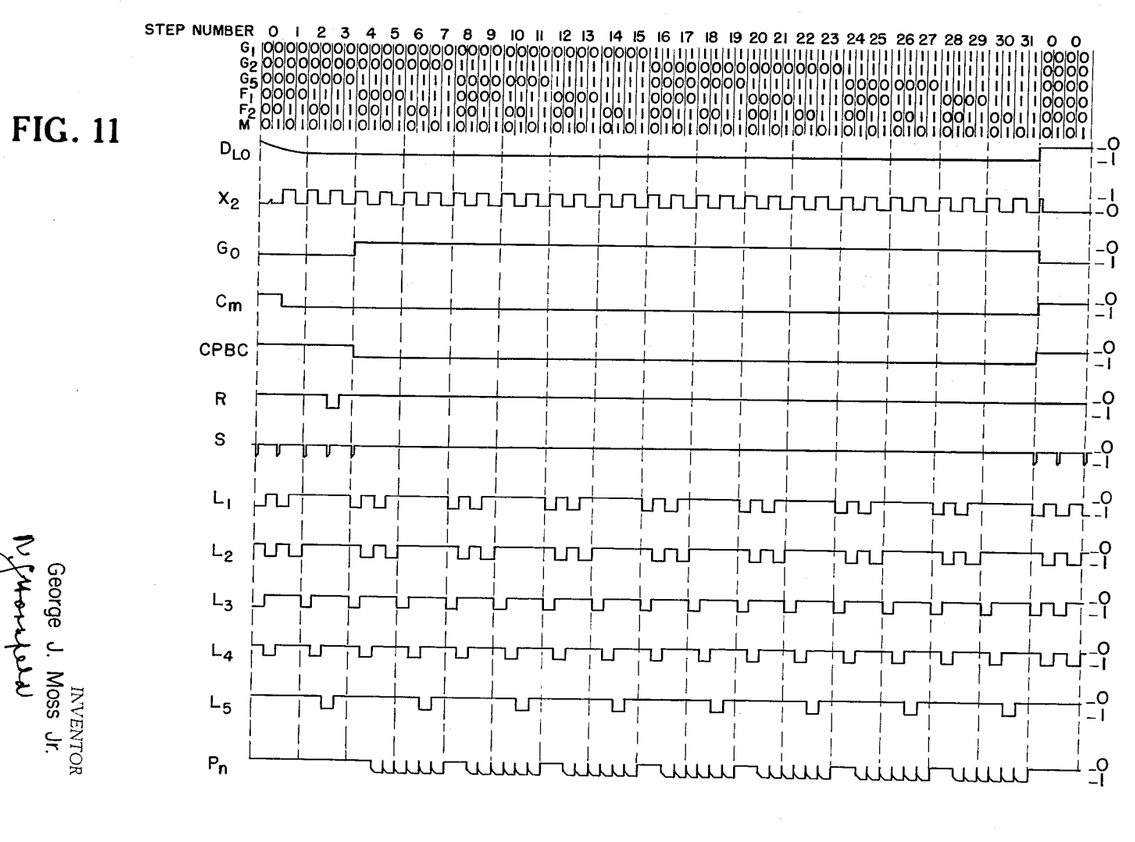
FIG. 11 is a table showing in time relationship various conditions occurring in the control circuitry of FIG. 10.

FIG. 11 shows the voltage waveforms generated by the sequencer during continuous cycling. It is assumed that the magnetic tape transport is operating and that the data anticipation signal generated by the tape reproducer is continuously present. Referring to FIG. 11, at the top the contents of the five-stage series cascaded binary counter of FIG. 10, comprising flip-flops 1017–1021, are shown. This counter is capable of counting thirty-two steps, 0 through 31. Directly below this counter is shown the state of the oscillator impulse M which drives the counter as described hereinbefore. Upon receipt of the data anticipation signal, monostable multivibrator 1012 is triggered. After a present time interval it decays to a negative voltage to allow the counter to count the $x_2$ pulses. At the change from the step 0 to step 1 the $C_m$ pulse goes from 0 to $-20$ volts to maintain the movement of the chart paper and printer 42, FIG. 9 in the event of a cessation of the data anticipation signal.

As shown in FIG. 11, during the first half of the third step a negative reset pulse is applied to the buffer memory 33, FIG. 6. In FIG. 11 during the change between steps 3 and 4 a set pulse S is applied to the buffer memory 33, FIG. 6, to transfer the contents of the minutes-units counter 17 to the buffer memory 33. The reason why a set pulse appears at this particular time requires further explanation. Because of an inherent time delay in the operation of a flip-flop, the sequencer does not go directly from the state $\overline{G}_1\overline{G}_2\overline{G}_3 F_1 F_2 M$ to the state $\overline{G}_1\overline{G}_2\overline{G}_3 \overline{F}_1 \overline{F}_2 \overline{M}$. It passes rapidly through the intermediate states $$\overline{G}_1\overline{G}_2\overline{G}_3 F_1 F_2 \overline{M},\ \overline{G}_1\overline{G}_2\overline{G}_3 F_1 \overline{F}_2 \overline{M},\ \overline{G}_1\overline{G}_2\overline{G}_3 \overline{F}_1 F_2 \overline{M}$$

and $\overline{G}_1\overline{G}_2\overline{G}_3 \overline{F}_1 \overline{F}_2 \overline{M}$ respectively as successive flip-flops operate. Thus there is a brief time interval between the time M goes from one to zero and the time $G_0$ goes from one to zero. During this brief time interval, the function $G_0\overline{M}$ is in the negative, or one state. The set pulse between steps 3 and 4 results from differentiation of the leading edge of this negative pulse of the function $G_0\overline{M}$. S pulses previous to this time perform no useful function, and are generated simply because their inhibition would require unnecessary additional circuitry.

Simultaneously with the last set pulse S, FIG. 11, the $\overline{G}_0$ signal goes from a positive to a negative voltage to connect the minutes-units counter 17, FIG. 6, to the set input of the flip-flop 652 of the carry pulse buffer circuit 19. At the same point of time in FIG. 11, the $G_0$ signal goes from negative to positive to prevent further reset and set pulses from passing through AND gates 1036 and 1029, respectively, FIG. 10. The output of the NOT gate 1037 changes from a positive to a negative voltage and passes through OR gate 1038 to continue the chart $C_m$ signal through amplifier 1041 and to continue the $X_2$ pulses through AND gate 1013.

Referring to FIG. 11 at the initiation of step 5, the $P_n$ signal changes from a positive to a negative voltage as soon as the conditions required by AND gate 1046 are satisfied, the conditions being that there be an $F_1$ or an $F_2$ signal, that $\overline{G}_0$ be a negative voltage, and that the output of NOT circuit 1045 be negative. The $P_n$ signals are produced by AND gate 1046, FIG. 10, and are applied to the inhibited amplifiers 841–843 of FIG. 8 and AND gate 906 of FIG. 9. The $P_n$ signals applied to inhibited amplifiers 841–843 allow the $P_1$–$P_3$ signals to pass through and be amplified and applied to AND gates 906–921, FIG. 9. Referring again to FIG. 11, during the steps 5, 6, and the first half of 7, the $L_1$–$L_9$ signals are changed from a positive to a negative voltage to sequentially enable the various channels of the printer through the AND gates 906–921. This causes line 1 (FIG. 2) of each of the numerals in the minutes-, hours-, and days-counters to be printed in sequence. Referring again to FIG. 11, during step eight no printing occurs since the $P_n$ signal inhibits the inhibit amplifiers 841–843 of FIG. 8. Starting with step 9 and continuing through the first half of step 11, the sequence of $P_n$ and $L_1$–$L_5$ signals is repeated to print the line 2 of the numerals, FIG. 2. This sequence continues through the first half of step 31 so that each of the seven lines of the numerals of FIG. 2 are printed.

With the exception of the days-tens counter, as was explained in reference to FIG. 9, each channel, that is, the minutes-units, minutes-tens, hours-units, hours-tens, and the days-units is printed at a different time in a different channel on the chart paper 922 of FIG. 9. The sequence of printing is line 1 of each one of these channels then line 2 and so on through line 7. The $L_1$–$L_5$ signals sample the contents of the counter seven different times to utilize the binary bits stored there to cause the printing by the electric styli 927, FIG. 9, to print the numerals in Arabic notation.

Referring again to FIG. 11, at the end of step 31, the five-stage counter of FIG. 10, consisting of flip-flops 1017–1021, returns to the zero state. At this point the sequencer has completed a cycle of operation and is about to start another cycle. It will be noted in FIG. 11 that the $G_1$ stage of the counter changes from the one to the zero state which produces a negative step output. Referring to FIG. 10, the zero output of flip-flop 1021, the $G_1$ stage, is applied to differentiator 1048 to produce a negative output pulse which passes through OR gate 1009 and is one input of the AND gate 1011.

Referring again to FIG. 11, it will be noted that the $G_1$, $G_2$ and $G_3$ stages all at this time change from the one to the zero state. The changing of flip-flops 1019–1021 to the zero state enables AND gate 1028 to produce a negative $G_0$ signal. This $G_0$ signal is supplied through wire 1049 and is a second input to the AND gate 1011 which produces a negative output. The negative output from AND gate 1011 sets the monostable multivibrator 1012 to the quasi-stable state so that its output $D_{L0}$ is in the positive, or binary zero state.

Referring to FIG. 10, the AND gate 1013 is no longer enabled so that the $X_2$ pulses are no longer produced and the counting chain is ended after the end of step 31 of FIG. 11.

Since the $G_0$ signal is now negative, the set and reset pulses are being produced by AND gates 1029 and 1036 and the NOT gate 1037 is producing a positive output which does not pass through OR gate 1038. Since the $F_1$ and $F_2$ stages of flip-flops 1018 and 1017, respectively, are in a zero state, the other input to the OR gate 1038 is also positive, so that no output is produced, which results in a cessation of the $C_m$ signal through amplifier 1041. Also the changing of the output of NOT gate 1037 from the negative to the positive potential produces a positive $\overline{G}_0$ signal which is applied to the carry pulse buffer circuit 19, FIG. 6. This positive pulse connects the minutes-units counter 17 directly to the minutes-tens counter 18, FIG. 7, through the Schmitt trigger 651, FIG. 6.

Until the monostable multivibrator 1012, FIG. 10, returns to the stable state, the oscillator 1066 and flip-flop 1007 just produce the M and $\overline{M}$ impulses. Since the counting chain, consisting of flip-flops 1017–1021, is not able to receive these impulses, the sequencer is in the idle state or non-print-out condition.

Referring to FIG. 10, it will be seen that during the presence of a tape transport operation signal, the data anticipation signal, acting through AND gate 1014, FIG. 10 and OR gate 1047, causes the chart paper to begin movement before the printing. If the data anticipation signal disappears before a row of numerals has been completely printed, the $C_m$ signal, acting through OR circuit 1047, maintains the chart motion until the numerals have been completed and the sequencer counter returns to zero. The chart movement while the output $D_{L0}$ of the monostable multivibrator 1012 is in the zero condition, causes a space to occur between rows of numerals.

SUMMARY

The electrical printing recorder of the embodiment described herein has a counting chain for counting input pulses indicative of a predetermined span of time. The counting chain is formed by a plurality of series connected cascaded counters for counting the various digits. Each counter comprises one or more stages for counting the binary bits indicative of the numeral counted.

Upon the occurrence of an external random event a pulse to the control sequencer circuit of the printing recorder initiates a cycle of operation known as the print-out cycle. This print-out cycle includes the steps of transferring a portion of the contents of the counting chain to a buffer memory and temporarily halting counting in another portion of the counting chain. A temporary storage unit replaces the halted portion of the counting chain to enable the timing pulses occurring during the print-out sequence cycle to be counted in the counting chain.

The primary contents of the counting chain including the buffer memory and the halted portion of the counting chain is sequentially converted or channelized to the corresponding Arabic digit.

In a parallel sequence, line-by-line printing operation, the binary bits representative of a digit stored in the various counters are gated in a time sequence to a moving chart paper. Through the channelizing circuitry and the gating circuitry the voltage from the various counters is applied to the predetermined styli to cause electrical printing by the styli on the moving chart paper.

It will be understood that various changes in the details, materials, steps and arrangements of parts, which have been hereindescribed and illustrated in order to explain the nature of the invention, may be made by those skilled in the art within the principles and scope of the invention as expressed in the appended claims.

What is claimed is:

1. A recorder for electrically printing the occurrence of a random pulse event comprising in combination,
   (1) a series-connected cascaded counting chain for counting digits by binary bits having an input for receiving a serial input pulse sequence applied to the input of said counting chain wherein each pulse supplied is indicative of an event and having a plurality of outputs,
   (2) a plurality of parallel readout means connected to the outputs of said counting chain,
   (3) channelizer means connected to said readout means for channelizing the binary bits stored by said counting chain to corresponding output stages representative of segments of an Arabic digit,
   (4) gating means connected to the output stages of said channelizer means for gating to a plurality of outputs in a time-based sequence predetermined stages of the said channelizer means,
   (5) and a printing means connected to the outputs of said gating means for electrically printing on a chart in spaced relationship the Arabic digit representative of the binary digit stored in said counting chain.

2. Apparatus as recited in claim 1 further comprising,
   (1) control circuit means having a predetermined sequence of functions for controlling the printing, utilizing the electrical potential of the binary cascaded counting chain of the Arabic digit including;
      (a) enabling means connected to said gating means for generating a time based sequence of output pulses for selectively energizing predetermined portions of said gating means in a fixed order,
      (b) signal means connected to said printing means for controlling movement of the chart paper to produce spaced relationship of the printing on the chart,
   (2) and chart movement means within said printing means connected to said signal means for moving the chart in response to a signal from said signal means.

3. Apparatus as recited in claim 2 wherein said signal means includes circuit means connected between said enabling means and said signal means for initiating a signal before and continuing during the time base sequence of output pulses of said enabling means thereby providing a space between the printed digits and preventing a hiatus in the printed digit.

4. Apparatus as recited in claim 3 wherein said control circuit means further includes initiating means connected to said enabling means for starting a generation of the sequence of output pulses of said enabling means upon the receipt of an external signal to said initiating means indicating the occurrence of a random event.

5. Apparatus as recited in claim 4 wherein said printing means includes a plurality of styli connected to the outputs of said gating means in contact with the chart paper for electrically printing a dot in response to an electrical pulse from said counting chain.

6. A recorder for printing the time of occurrence of a random event comprising, in combination,
   (1) a series connected cascaded counting chain having,
      (a) a plurality of counters connected in a series cascaded counting chain for counting digits in binary notation,
      (b) means for applying serial input pulse chain to the first counter in the chain of said counters wherein each applied pulse is indicative of a predetermined time period,
      (c) a plurality of parallel readout means connected to a portion of said bistable counters,
   (2) a carry pulse buffer storge and transfer circuit serially connected between two of said plurality of bistable counters having an input terminal connected to the serial output terminal of one of said counters and an output terminal connected to the serial input terminal of another of said counters including,
      (a) a first mode of operation having transfer means for immediately transferring pulses received on the input terminal to the output terminal,
      (b) a second mode of operation having delay means for delaying pulses received on the input terminal for a period of time before transferring the received pulses to the output terminal,
      (c) switching means connected to said transfer means and said delay means for selectively engaging one of said two modes of operation,
   (3) channelizer means connected to said readout means for channelizing the binary bits stored by said counting chain to corresponding stages representative of segments of an Arabic digit,
   (4) gating means connected to said channelizer means for gating to a plurality of outputs in a time based sequence predetermined stages of said channelizer means,
   (5) and printing means connected to the outputs of said gating means for printing on a chart in spaced relationship the Arabic digit representative of the binary digits stored in said bistable counter.

7. Apparatus as recited in claim 6 wherein each of said bistable counters of said cascaded counting chain comprises a plurality of bistable stages, series connected in a cascaded chain for counting a binary bit and each stage having an output terminal connected to said channelizer means.

8. Apparatus as recited in claim 6 wherein said plurality of bistable counters comprises,
   (1) a minutes-units scale of ten counter having an input connected to said means for receiving a serial input pulse chain and an output connected to said input terminal of said carry pulse buffer storage and transfer circuit,
   (2) a minutes-tens scale of six counter having an input connected to the output terminal of said carry pulse buffer storage and transfer circuit and an output terminal,
   (3) an hours-units and tens scale of 24 counter having an input terminal connected to the output of said minutes-tens scale of six counter and an output terminal,
   (4) and a days-units scale of ten counter having an input connected to the output of said hours-units and tens scale of 24 counter.

9. Apparatus as recited in claim 8 further comprising a buffer memory connected to the outputs of said minutes-units counter for receiving and storing the contents of said minutes-units counter while said carry pulse buffer storage and transfer circuit is in the second mode of operation and having a plurality of outputs connected to said channelizer means.

10. Apparatus as recited in claim 8 further comprising,
    (1) a seconds scale of sixty counter having an output connected to said minutes-units counter and having an input connected to said means for receiving a serial input pulse,
    (2) and switch means connected to said means for receiving a serial input pulse to selectively direct the input pulses to one of said counters comprising minutes-units counter and said seconds scale of sixty counter.

11. Apparatus as recited in claim 7 wherein said channelizer means comprises a plurality of gates having inputs connected to the output terminals of the stages of said bistable counter for combining the binary outputs of said counters in a predetermined order indicative of segments of the Arabic digit as printed to produce an output for said gating means upon the concurrence of the necessary input conditions.

12. Apparatus as recited in claim 7 further comprising control circuit means having a predetermined sequence of output pulses for controlling the printing of the Arabic digit utilizing the electrical potential of the binary cascaded counting chain including,
(1) enabling means connected to said gating means for internally generating a time based sequence of output pulses for selectively energizing predetermined portions of said gating means in a fixed order,
(2) signal means connected to said printing means for controlling movement of the chart paper to produce the spaced relationship of the printing on the chart,
(3) and chart movement means within said printing means connected to said signal means for moving the chart in response to a signal from said signal means.

13. Apparatus as recited in claim 12 wherein said signal means includes circuit means connected between said enabling means and said signal means for initiating a continuous signal on said signal means before and continuing during the time based sequence of output pulses of said enabling means thereby providing a space between the printed digits and preventing a hiatus in the printed digit.

14. Apparatus as recited in claim 13 wherein said control circuit means further includes initiating means connected to said enabling means for starting the generation of the sequence of output pulses of said enabling means upon the receipt of an external signal to said initiating means indicating the occurrence of a random event.

15. Apparatus as recited in claim 14 wherein said printing means includes a plurality of styli connected to the outputs of said gating means in contact with the chart paper for electrically printing a dot in response to an electrical pulse from said bistable stages.

16. A counting chain control system having a carry pulse buffer storage and transfer circuit comprising,
(1) a transfer circuit for immediately transferring pulses received on an input pulse terminal to an output terminal including,
    (a) a first diode connected between said input and said output terminals for transferring pulses received on said input terminal to said output terminal when said first diode is in a conductive state,
    (b) and first control means connected to said first diode for controlling the conduction or nonconduction of said first diode in response to a first and a second pulse respectively, applied to said first control means,
(2) a delay means for delaying pulses received on said input terminal for a period of time before transferring the received pulses to said output terminal including,
    (a) a storage means for storing received pulses having an output connected to said output terminal and set and reset terminals,
    (b) a second diode connected between said input terminal and the set terminal for transferring pulses received on said input terminal to said set terminal when said second diode is in a conductive state,
    (c) second control means connected to said second diode for controlling the nonconduction or conduction of said second diode in response to the first and second pulses respectively, applied to said second control means,
    (d) pulse means connected to the reset terminal of said storage means for applying reset pulse to the reset terminal in response to the changing of the second pulse to the first pulse to transfer the stored pulse from said storage means to said output terminal.
(3) a means connected to said first control means, said second control means, and said pulse means for applying the first and second pulse to the last three named means.

References Cited by the Examiner

UNITED STATES PATENTS

| | | | |
|---|---|---|---|
| 2,933,364 | 4/60 | Campbell | 346—33 |
| 3,063,631 | 11/62 | Ray | 346—33 |
| 3,083,356 | 3/63 | Morris | 346—33 |
| 3,085,132 | 4/63 | Innes | 178—30 |
| 3,118,721 | 1/64 | Exline | 346—33 |

LEYLAND M. MARTIN, *Primary Examiner.*

LEO SMILOW, *Examiner.*